United States Patent
DeVaul et al.

(10) Patent No.: US 9,227,168 B1
(45) Date of Patent: Jan. 5, 2016

(54) WIND-POWERED VESSEL FOR REMOVAL OF CARBON DIOXIDE FROM SEAWATER

(71) Applicant: Google Inc., Mountain View, CA (US)

(72) Inventors: Richard Wayne DeVaul, Mountain View, CA (US); Damon Vander Lind, Alameda, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/224,021

(22) Filed: Mar. 24, 2014

Related U.S. Application Data

(63) Continuation-in-part of application No. 13/288,527, filed on Nov. 3, 2011, now Pat. No. 8,922,046.

(60) Provisional application No. 61/409,894, filed on Nov. 3, 2010.

(51) Int. Cl.
| | | |
|---|---|---|
| *F03D 9/00* | (2006.01) | |
| *H02P 9/04* | (2006.01) | |
| *B01J 19/08* | (2006.01) | |
| *B63B 35/44* | (2006.01) | |
| *B64C 39/02* | (2006.01) | |

(52) U.S. Cl.
CPC ............... *B01J 19/08* (2013.01); *B63B 35/44* (2013.01); *B64C 39/022* (2013.01); *F03D 9/002* (2013.01)

(58) Field of Classification Search
CPC .......... B01J 19/08; F03D 9/002; B63B 35/44; B64C 39/022
USPC ............... 290/55, 44, 43, 54; 244/154, 155 A
See application file for complete search history.

(56) References Cited

U.S. PATENT DOCUMENTS

| | | | |
|---|---|---|---|
| 4,282,187 A | 8/1981 | Corbett et al. | |
| 4,568,522 A | 2/1986 | Corbett | |
| 5,435,259 A | 7/1995 | Labrador | |
| 6,113,773 A * | 9/2000 | Shimamune et al. | ......... 205/466 |
| 7,129,596 B2 | 10/2006 | Macedo | |
| 8,080,889 B2 | 12/2011 | Ippolito et al. | |
| 8,277,632 B2 | 10/2012 | Murahara | |

(Continued)

FOREIGN PATENT DOCUMENTS

EP  2698312  2/2014

OTHER PUBLICATIONS http://parc.com/publication/2837/co2-extraction-from-seawater-using-bipolar-membrane-electrodialysis.html.

(Continued)

*Primary Examiner* — Javaid Nasri
(74) *Attorney, Agent, or Firm* — McDonnell Boehnen Hulbert & Berghoff LLP

(57) ABSTRACT

Disclosed embodiments relate to an ocean-going vessel that includes an airborne wind turbine to generate power. The generated power can be used for an electrodialysis system that extracts carbon dioxide ($CO_2$) from seawater and/or for an electrolysis system that produces hydrogen ($H_2$), both of which are disposed on the ocean-going vessel. The ocean-going vessel further includes a refinery system that may use a mixture of the $H_2$ and $CO_2$ gases that are to produce a fuel or chemical. In an example embodiment, the mixture of the $H_2$ and $CO_2$ gases may be processed to produce a synthetic fuel, which in turn may be processed to produce ethanol.

21 Claims, 5 Drawing Sheets

(56) References Cited

U.S. PATENT DOCUMENTS

| | | |
|---|---|---|
| 8,575,770 B2 | 11/2013 | Devine |
| 2007/0176432 A1 | 8/2007 | Rolt |
| 2009/0221725 A1 | 9/2009 | Chornet et al. |
| 2011/0101692 A1 | 5/2011 | Bilaniuk |
| 2012/0104763 A1 | 5/2012 | Lind |
| 2013/0008792 A1 | 1/2013 | Eisaman et al. |
| 2013/0193266 A1 | 8/2013 | DiMarzio et al. |
| 2013/0213289 A1 | 8/2013 | Borden et al. |
| 2013/0221679 A1 | 8/2013 | Vander Lind |

OTHER PUBLICATIONS

Eisaman et al.; "CO2 Extraction from Seawater Using Bipolar Membrane Electrodialysis"; accepted by the Royal Society of Chemistry 2012 on Jan. 23, 2012.

Graves, Christopher Ronald; "Recycling CO2 into Sustainable Hydrocarbon Fuels: Electrolysis of CO2 and H2O"; submitted in partial fulfillment of the requirements for the degree of Doctor of Philosophy in the Graduate School of Arts and Sciences; Columbia University, 2010.

Pickering, Keith; "Seawater + electricity = jet fuel"; published on the website: Daily Kos; Jan. 18, 2013.

Jiang, Z. et al; "Turning carbon dioxide into fuel"; published in the journal: Royal Society Sep. 27, 2010.

Holte, Laura L. et al.; "Sustainable Transportation Fuels from Off-Peak Wind Energy, CO2, and Water"; Proceedings of ES2010 Energy Sustainability May 17, 22, 2010, Phoenix, AZ USA.

DeVaul et al., U.S. Appl. No. 14/224,021, filed Mar. 24, 2014, 41 pages.

Vander Lind et al., U.S. Appl. No. 14/485,412, filed Sep. 12, 2014, 62 pages.

Vander Lind et al., U.S. Appl. No. 14/620,201, filed Feb. 12, 2015, 61 pages.

* cited by examiner

WIND-POWERED VESSEL FOR REMOVAL OF CARBON DIOXIDE FROM SEAWATER

RELATED APPLICATIONS

This patent application claims priority to U.S. patent application Ser. No. 13/288,527, filed on Nov. 3, 2011, which claims priority to U.S. Provisional Patent Application No. 61/409,894, filed on Nov. 3, 2010. The contents of both of these applications are entirely incorporated herein by reference, as if fully set forth in this application.

BACKGROUND

Unless otherwise indicated herein, the materials described in this section are not prior art to the claims in this application and are not admitted to be prior art by inclusion in this section.

There is a great amount of captured $CO_2$ in the world's oceans and seas. This is the result of $CO_2$ in the atmosphere dissolving in seawater. Thus, as more $CO_2$ is released into the atmosphere, the amount of $CO_2$ in the oceans and seas continues to rise. This is problematic for various reasons, such as the fact that increased $CO_2$ levels in the ocean makes the ocean more acidic.

In particular, the reaction of $CO_2$ with seawater produces carbonic acid as follows: $CO_2+H_2O \rightarrow H_2CO_3$. Carbonic acid is diprotic, and thus disassociates in two ways, releasing hydrogen ions ($H^+$) and either bicarbonate ($HCO3^-$) or carbonate ($CO_3^{2-}$) ions. Both dissociations can occur simultaneously, with the amount of dissociated carbonic acid that releases bicarbonate as compared carbonate varying according to the pH of the water. In typical seawater, the majority of $CO_2$ dissociation releases bicarbonate. In both cases, the release of hydrogen ions increases the acidity of the seawater (i.e., lowers the pH of the seawater).

SUMMARY

Example methods and systems may involve an ocean-going vessel that is configured to remove carbon dioxide ($CO_2$) from the ocean, and to use the removed $CO_2$ in a process that produces fuel. Further, the ocean-going vessel may be powered, at least in part, by an airborne wind turbine (AWT) configured for wind power generation. Desirably, in some embodiments, the use of wind energy from an AWT may help to make the production of fuel a carbon-neutral or carbon-negative process.

In one aspect, an example system includes: (a) an ocean-going vessel; (b) an electrodialysis system arranged on the ocean-going vessel and configured to extract carbon dioxide ($CO_2$) from seawater that passes through one or more membranes; (c) an electrolysis system arranged on the ocean-going vessel and configured to apply electrolysis to seawater to produce hydrogen ($H_2$); (d) a refinery system configured to use both the $H_2$ produced by electrolysis system and the $CO_2$ extracted by the electrodialysis system to produce a fuel or chemical; and (e) at least one airborne wind turbine (AWT) configured to convert wind energy to electrical energy, wherein the at least one airborne wind turbine provides power for at least one of the electrolysis system and the electrodialysis system.

In another aspect, an example method involves: (a) operating an electrodialysis system that to extract carbon dioxide ($CO_2$) gas from seawater that passes through one or more membranes of the electrodialysis system, wherein the electrodialysis system is arranged on an ocean-going vessel; (b) operating an electrolysis system to apply electrolysis to seawater to produce hydrogen ($H_2$) gas, wherein the electrolysis system is arranged on the ocean-going vessel; (c) operating a refinery system to: (i) receive both the $H_2$ gas produced by electrolysis system and the $CO_2$ gas extracted by the electrodialysis system and (ii) process a mixture of the $H_2$ gas and the $CO_2$ gas to produce a fuel or chemical; and (d) operating at least one airborne wind turbine (AWT) to convert wind energy to electrical energy, such that the AWT provides power to at least one of the electrolysis system and the electrodialysis system for at least some period of time.

In a further aspect, an example system includes: (a) a first water-processing system arranged on an ocean-going vessel and configured to extract carbon dioxide ($CO_2$) from seawater that passes through one or more membranes; (b) a second water-processing system arranged on the ocean-going vessel and configured to apply electrolysis to seawater to produce hydrogen ($H_2$); (c) at least one refinery system configured to use both the $CO_2$ extracted by the first water-processing system and the $H_2$ produced by second water-processing system and the to produce at least one fuel or chemical; and (d) at least one airborne wind turbine (AWT) configured for power generation, wherein the at least one airborne wind turbine provides power for at least one of the first water-processing system and the second water-processing system.

These as well as other aspects, advantages, and alternatives will become apparent to those of ordinary skill in the art by reading the following detailed description, with reference where appropriate to the accompanying drawings.

DETAILED DESCRIPTION

Figure 1:
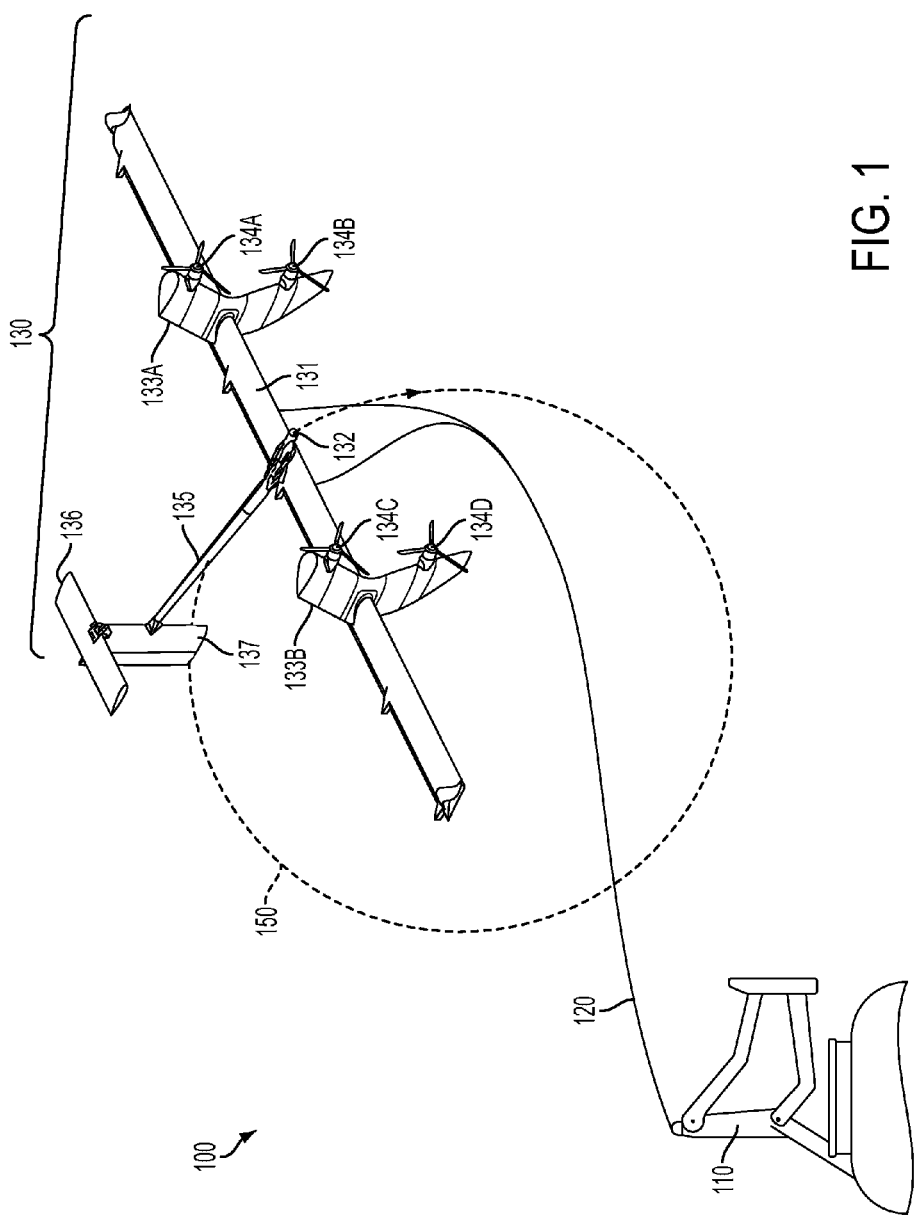
FIG. 1 is an illustration of an airborne wind turbine, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example embodiments may help to slow, and perhaps decrease, the amount of carbon dioxide ($CO_2$) in the ocean. In particular, example embodiments may take the form of or relate to a ocean-going vessel, which is powered by an airborne wind turbine (AWT), and which uses seawater and green energy as inputs to a process that generates carbon-neutral or carbon-negative chemicals and/or fuels (e.g., ethanol, synthetic fuel, etc.). To generate such petrochemicals or fuels, the ocean-going vessel uses an electrodialysis process to extract carbon dioxide ($CO_2$) from seawater. The vessel also includes an electrolysis system that is configured to apply electrolysis to seawater to produce hydrogen ($H_2$) gas. The vessel may also include a refinery system that produces a fuel or chemical from the hydrogen and $CO_2$ that is extracted from the seawater.

Various types of fuels may be produced. For example, a vessel may produce petrochemicals or petro fuels such as ethanol or methanol (possibly distilled and potable). Further, note that such a process may even be able to make what was previously considered a fossil fuel (e.g., a non-renewable energy source) into a renewable energy source. For instance, some embodiments may be configured to uses seawater and green energy (e.g., wind power and/or solar power) as inputs to a process that generates diesel fuel or jet fuel, for example. While burning such fuels releases $CO_2$ into the atmosphere, at least some of this $CO_2$ may dissolve back into the ocean, where it can be extracted in accordance with an example embodiment, and used to generate more diesel or jet fuel. In a sense, the process may allow for recycling of $CO_2$ and replenishing of fuel stocks, such that the release of $CO_2$ when such fuels are burned is of less concern.

In an example embodiment, the vessel's AWT includes a tethered aerial vehicle that flies in a circular or ellipsoidal path in order to convert wind energy into electrical energy. The electrical energy is then relayed to a ground station on the ocean-going vessel via the tether. Such an AWT may be less complex to install and use in the open ocean than other types of green power generation systems (e.g., traditional wind turbines). Further, an AWT may have greater power generation capabilities than other systems that can be readily installed on an ocean-going vessel, such as a solar power generation system.

The power generated by the AWT may be used to power the ocean-going vessel's electrodialysis system, and possibly to power the vessel's electrolysis system and the refinery system as well. In some embodiments, the AWT may be the only source of power. In other embodiments, the vessel could include both an AWT and a solar power generation system.

Thus, an illustrative ocean-going vessel may produce valuable fuels using nothing but renewable energy, while at the same time altering the ocean's chemistry in a desirable manner. Specifically, the production of fuel removes dissolved $CO_2$ and lowers the acidity of the seawater. Therefore, a large fleet of such vessels has the potential to drastically improve the health of the ocean (e.g., by making seawater more conducive for coral reefs), and further, has the potential to slow, halt, or possibly even reverse climate change by increasing the ocean's ability to absorb $CO_2$ from the atmosphere.

In a further aspect, the AWT's aerial vehicle could also serve as a propulsion system for the ocean-going vessel, pulling it through the water. Additionally, the electrodialysis system could be designed such that as the vessel moves through the water, water is forced through the membranes of the electrodialysis system. Configured as such, the power required to pump seawater through the electrodialysis system may be reduced.

It should be understood that an ocean-going vessel may be any type of vehicle that is positively buoyant in a saltwater body of water, such as an ocean, a sea, or a saltwater lake (which could be naturally-occurring, or conceivably even man-made). A saltwater body of water may have water with a salinity that is typical of oceans and seas, or could have water with lower salinity (e.g., a brackish body of water). In general, any water having a salinity that is sufficient will suffice.

II. Illustrative Airborne Wind Turbines

As discussed generally above, an example ocean-going vessel may be powered, at least in part, by a wind energy system, and in particular, by an airborne wind turbine (AWT) system. An AWT may include an aerial vehicle that flies in a path, such as a substantially circular or elliptical path, to convert kinetic wind energy to electrical energy. In an example embodiment, the aerial vehicle may be connected to a ground station via a tether. The "ground station" may in fact be a component on the ocean-going vessel, or, alternatively, if the aerial vehicle is tethered directly to a surface of the ocean-going vessel, the ocean-going vessel itself may be considered the ground station. In any case, while tethered, the aerial vehicle may: (i) fly at a range of elevations and substantially along the path, and return to the ground, and (ii) transmit electrical energy to the ground station via the tether. Further, in some embodiments, the ground station may transmit electricity to the aerial vehicle for take-off and/or landing.

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, or crosswind flight.

In addition, the ground station 110 may include one or more components (not shown), such as a winch, that may vary a length of the tether 120. Such components will be described in greater detail later in this disclosure. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be used in the formation of aerial vehicle as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

Figure 2:
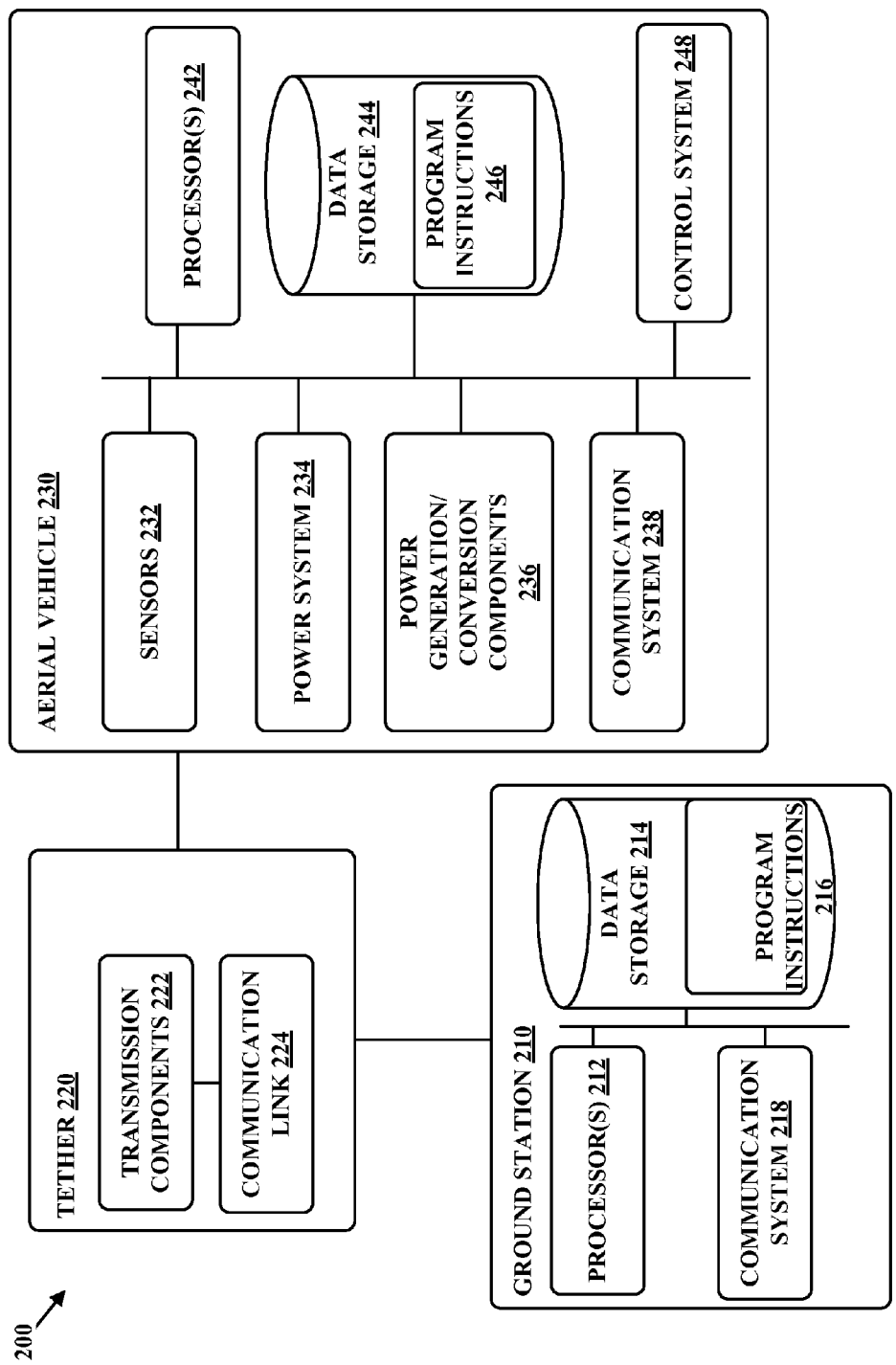
FIG. 2 is a simplified block diagram illustrating components of an airborne wind turbine, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that may allow for both short-range communication and long-range communication. For example, ground station 210 may be configured for short-range communications using Bluetooth and may be configured for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material that may allow for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full-rated-power wind speeds of 11.5 meters per second, at a capacity factor which may exceed 60 percent. As such, the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

III. Illustrative Ocean-Going Vessels

Figure 3A:
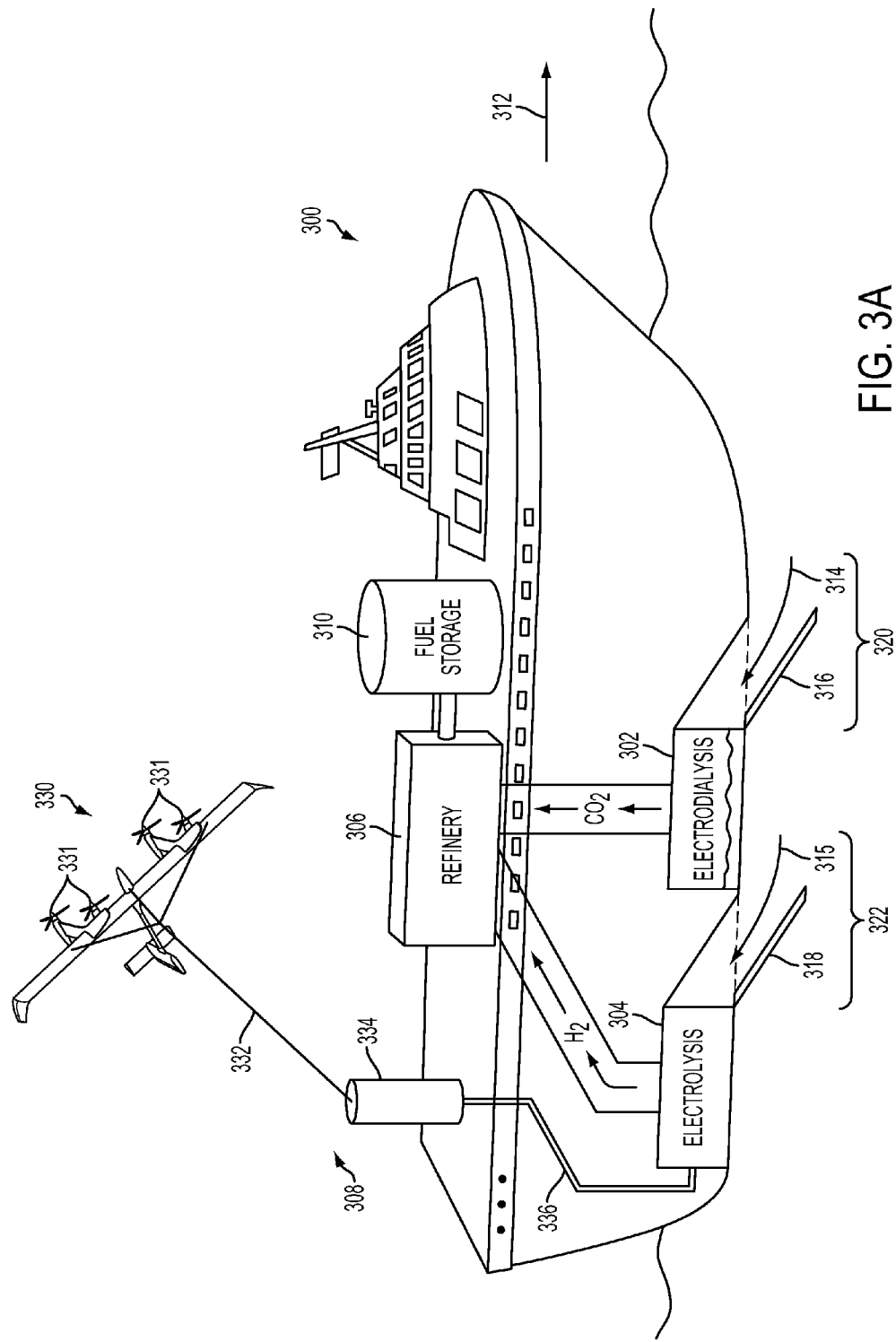
FIG. 3A is a simplified illustration of an ocean-going vessel, according to an example embodiment.

FIG. 3A is a simplified illustration of an ocean-going vessel 300, according to an example embodiment. As shown, the ocean-going vessel 300 includes an electrodialysis system 302, an electrolysis system 304, a refinery system 306, an AWT 308, and a fuel storage container 310.

In the illustrated example, the ocean-going vessel 300 is a ship. As such, ocean-going vessel 300 may include one or more electric- or gas-powered propulsion systems (e.g., engines coupled to submerged propellers) that are typical of ships. Other types of propulsion systems are also possible. Alternatively, ocean-going vessel 300 could be a sailboat. Further, ocean-going vessel 300 may be implemented on various types of ships, which may have various types of hulls, and which may have a different number of hulls (e.g., a single-hull, a catamaran, a trimaran, etc.).

In some embodiments, ocean-going vessel 300 may have no propulsion system or capability of steering itself. For example, in some embodiments, an ocean-going vessel may be a floating platform. Such a floating platform may be anchored in some manner, such as by a line that is attached to the floor of the body of water. However, it is also possible that the floating platform could be allowed to float freely, and directed by a tugboat or towboat when needed.

Figure 4:
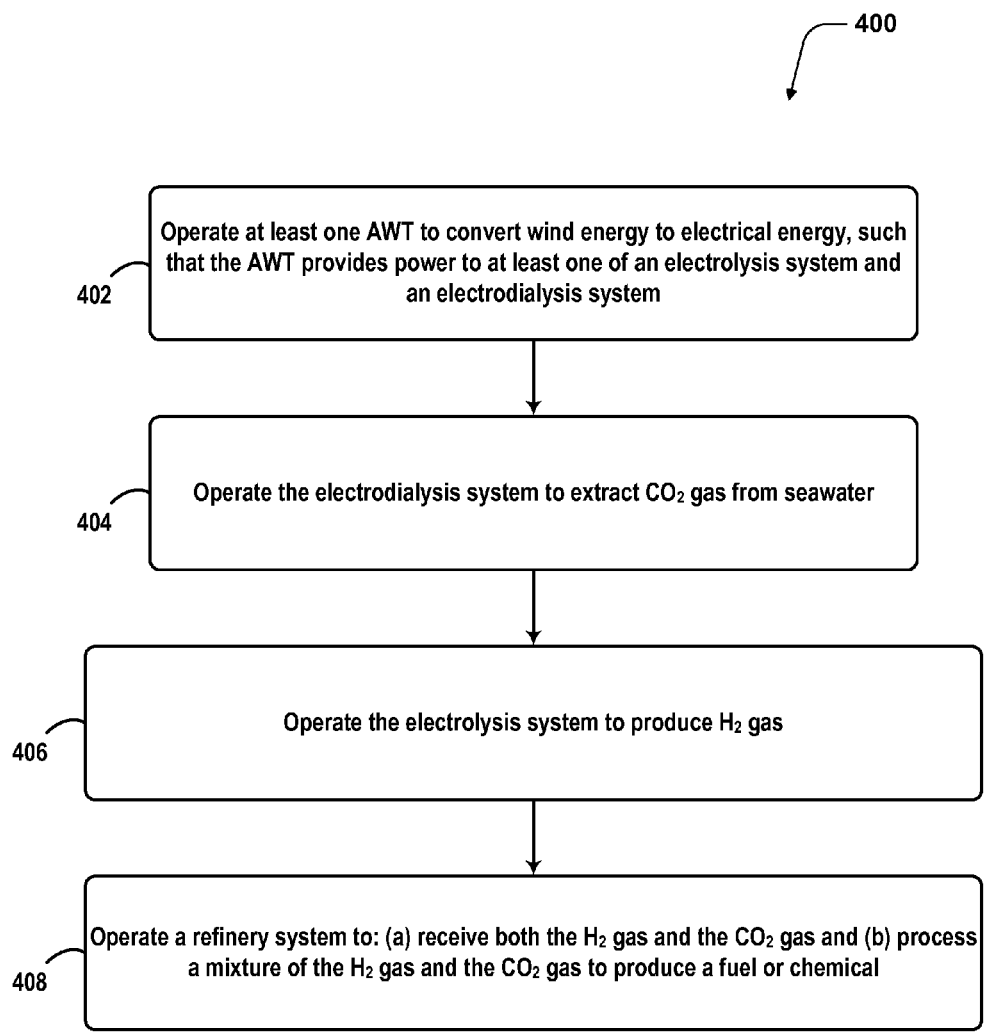
FIG. 4 is a flowchart illustrating a process that may be implemented by one or more control systems on an ocean-going vessel, according to an example embodiment.

FIG. 4 is a flow chart illustrating a process that may be implemented by one or more control systems on an ocean-going vessel that includes an AWT, according to an example embodiment. As shown, method 400 involves operating at least one AWT to convert wind energy to electrical energy, such that the AWT provides power to at least one of an electrolysis system and an electrodialysis system for at least some period of time, where both the electrodialysis system and the electrolysis system are disposed on an ocean-going vessel, as shown by block 402. Further, method 400 involves operating the electrodialysis system to extract carbon dioxide ($CO_2$) gas from seawater, and operating the electrolysis system to apply electrolysis to seawater to produce hydrogen ($H_2$) gas, as shown by blocks 404 and 406, respectively. Yet further, method 400 involves operating a refinery system to: (a) receive both the $H_2$ gas produced by electrolysis system and the $CO_2$ gas extracted by the electrodialysis system and (b) process a mixture of the $H_2$ gas and the $CO_2$ gas to produce a fuel or chemical, as shown by block 408.

A. Electrodialysis Systems

Referring again to FIG. 3A, in an example embodiment, ocean-going vessel 300 includes an electrodialysis system 302, which is configured to extract carbon dioxide ($CO_2$) from seawater that passes through one or more membranes of the electrodialysis system 302. The $CO_2$ that is produced can then be supplied to the refinery system 306.

Further, once a BPMED system removes the dissolved $CO_2$ from the acidified seawater, the acidified seawater can be combined with the basified seawater. Combining the stripped and acidified seawater with the basified seawater may neutralize the pH of the resulting solution, such that it can be safely output into the ocean.

In some embodiments, an ocean-going vessel 300 may include a system that uses fractional distillation of water to separate $CO_2$ form other absorbed gases. Other techniques for extracting $CO_2$ from seawater are also possible. In general, it is contemplated that an ocean-going vessel 300 may use any feasible technique and/or system for extracting $CO_2$ from seawater In a further aspect, an intake 320 is arranged such that movement of the vessel through water forces seawater to flow into the electrodialysis system 302. In the illustrated configuration, the intake 320 includes an angled feature 316. The angled feature extends from the bottom of the vessel 300, such that when the vessel moves through water (e.g., in the general direction indicated by arrow 312), water is forced to flow through the intake 320 into electrodialysis system 302, as indicated by arrow 314. This intake configuration may be beneficial as it uses the motion of the vessel through the water to provide the energy needed to move seawater to the electrodialysis system 302, and thus may alleviate the need to use an electric or fuel-powered pump to supply seawater to and/or move seawater through the electrodialysis system 302.

It should be understood that intake 320 is just one example of a structural design that forces water into the electrodialysis system 302, and thus alleviates or reduces the need for a pump. It is contemplated that other structural designs providing similar functionality may be utilized. Further, it is possible that an ocean-going vessel may utilize one or more pumps to supply seawater to and/or move seawater through the electrodialysis system 302, instead of or in addition to using a structural design that forces water to the electrodialysis system 302.

As one additional example, in some embodiments, the intake to the electrodialysis system 302 and/or to the electrolysis system 304 may include an impeller through which water flows before entering the electrodialysis system 302 and/or to the electrolysis system 304. As such, such, when the vessel moves forward the forward motion of the vessel creates a pressure gradient that pulls water through the intake and spins the impeller, thus increasing the pressure of water flowing into the electrodialysis system 302 and/or into the electrolysis system 304.

B. Electrolysis Systems

In an example embodiment, ocean-going vessel 300 includes an electrolysis system 304, which is configured to apply electrolysis to seawater to produce hydrogen ($H_2$). In particular, the electrolysis system 304 takes in and processes seawater in order to produce $CO_2$ $H_2$ gas; e.g., by applying a current to water to drive the following reaction: $2H_2O \rightarrow 2 H_2 + O_2$.

The $H_2$ gas that is produced by electrolysis system 304 can then be supplied to the refinery system 306 for production of fuels or chemicals. Further, the oxygen ($O_2$) gas that is produced by the electrolysis system 304 may be vented into the atmosphere or used for some other purpose.

In a further aspect, an intake 322 is arranged such that movement of the vessel through water forces seawater to flow into the electrolysis system 304. In the illustrated configuration, the intake 322 includes an angled feature 318, which functions similarly to the angled feature 316 of intake 320. As such, when the vessel moves through water (e.g., in the general direction indicated by arrow 312), water is forced to flow through intake 322 into electrolysis system 304, as indicated by arrow 315.

It should be understood that intake 322 is just one example of a structural design that forces water into the electrolysis system 304 and thus alleviates the need for a pump to do so. It is contemplated that other structural designs providing similar functionality may be utilized. Further, it is possible that an ocean-going vessel may utilize one or more pumps to supply seawater to and/or move seawater through the electrolysis system 304, instead of or in addition to using a structural design that forces water to the electrolysis system 304.

C. Illustrative Airborne Wind Turbines

As noted above, ocean-going vessel 300 includes an AWT 308, which is operable generate electrical energy for the vessel. As such, the AWT 308 may be utilized to generate power for the electrolysis system 304, the electrodialysis system 302, and/or other components or systems on the ocean-going vessel 300. The AWT 308 may take a form and operate as described in reference to FIGS. 1 and 2, or may take another form and/or may operate in a different manner.

As described above, an AWT such as AWT 308 may be configured to operate in a hover-flight mode, as well as in a crosswind-flight mode (e.g., for power generation). In a further aspect of some embodiments, an AWT 308 may be configured to operate in a vessel-steering mode. In such an embodiment, the AWT 308 may fly so as to steer and/or pull the ocean-going vessel 300.

Figure 3B:
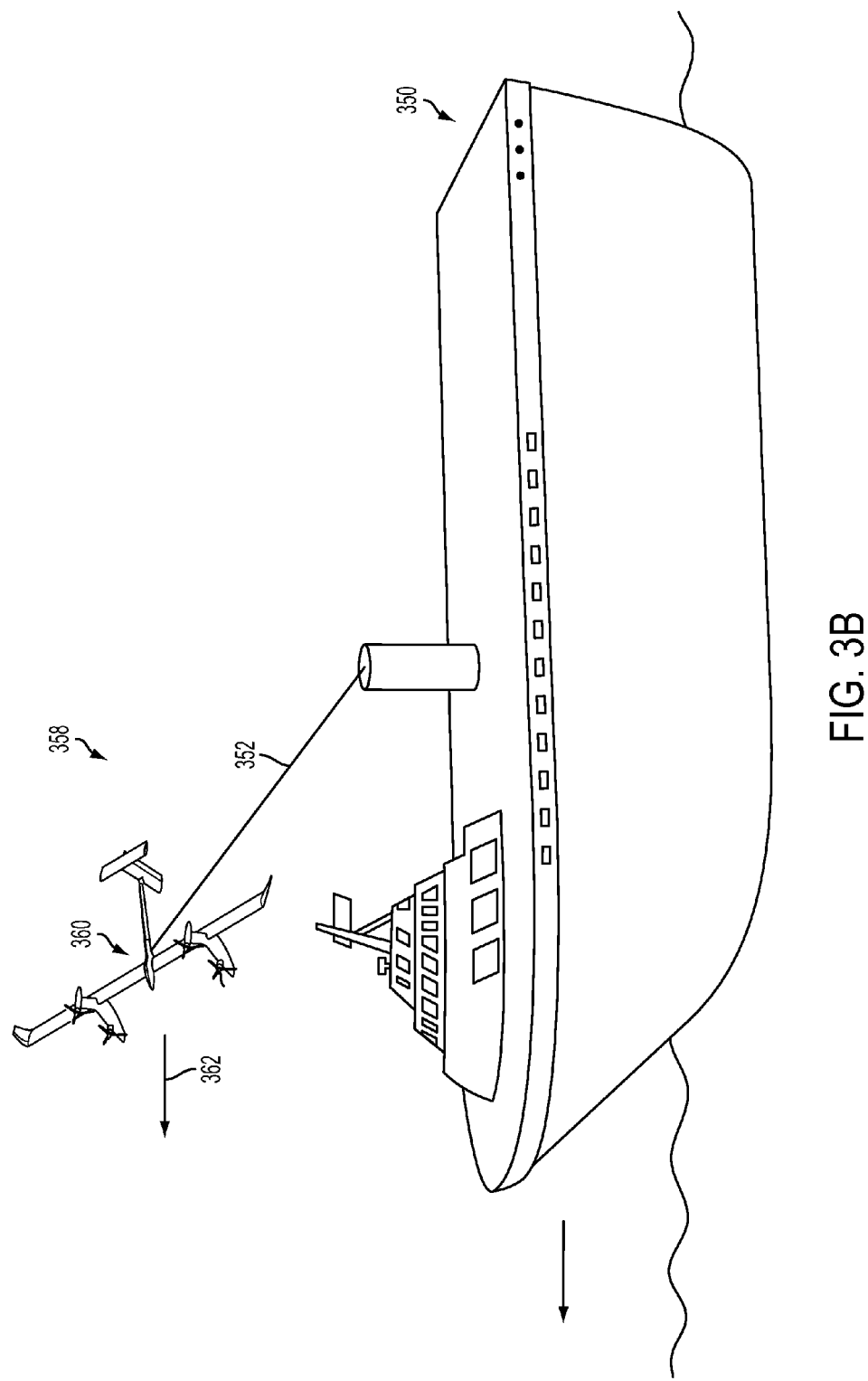
FIG. 3B is an illustration showing an airborne wind turbine installed on an ocean-going vessel and operating in a vessel-steering mode, according to an example embodiment.

For example, FIG. 3B is an illustration showing an AWT 358 operating in a vessel-steering mode. As shown, in the vessel steering mode, the aerial vehicle 360 may be positioned for forward flight in the direction indicated by arrow 362. (Note that "forward flight" should be understood to mean that at least a component of the vehicle's trajectory is in the forward direction.) Thus, the aerial vehicle may use its propulsion system (e.g., its rotors, which also function as wind turbines when in crosswind-flight mode) to create a thrust vector having a horizontal component as indicated by arrow 362, such that it tows the ocean-going vessel 350 via tether 352.

In some embodiments, the aerial vehicle 360 may be configured to tow the ocean-going vessel 350 in a desired direction. To do so, the aerial vehicle 360 may maneuver such that its thrust vector has a horizontal component in the direction in which it is desired for the vessel to travel. Doing so may cause the vessel 350 to turn until the vessel's is travelling in the direction of the horizontal component of the aerial vehicle's thrust vector.

In a further aspect, an aerial vehicle may be operable to tow the vessel 350 in order to assist the vessel in turning. For example, if the ocean-going vessel 350 is using its own propulsion and steering systems to turn to the right or the left, the aerial vehicle may operate in forward-flight mode and turn right or left such that the horizontal component of its thrust vector is angled to the right or left of the vessel's current direction of travel. Doing so may thus help the ocean-going vessel 350 to turn more quickly than it otherwise could, if only using its other propulsion systems.

In some embodiments, the aerial vehicle 360 may be configured to tow the ocean-going vessel 350 in a desired direction, while at the same time operating in a crosswind-flight mode and generating power. In particular, while aerial vehicle 360 is in crosswind-flight, there may be a horizontal component of the force that the aerial vehicle 360 exerts on the vessel 350. The vessel 350 may further include a keel and/or a rudder (or other features), that can help to steer the vessel when the horizontal component of the force that the aerial vehicle 360 exerts on the vessel differs from the desired direction of travel. Essentially, the aerial vehicle may operate in a similar manner as a traditional sail does, in conjunction with a keel and/or a rudder (or other features), in order to steer vessel 350.

D. Illustrative Power Systems

Referring back to FIG. 3A, in an exemplary embodiment, some or all of the energy that used to power the electrolysis system 304 may be provided by the AWT 308. Accordingly, the ground station of the AWT may be electrically connected to the electrolysis system, such that electrical power that is generated by airflow rotating the rotors of the aerial vehicle 330 can be relayed to the electrolysis system 304 via the tether 332, ground station 334, and an electrical connection 336. Provided with this electricity source, the electrolysis system 304 can then apply a current to water to perform electrolysis. Further, note that while electrical connections between the AWT 308 and other components of the ocean-going vessel are not shown in FIG. 3A, the AWT 308 may also be electrically coupled to other components, such as electrodialysis system 302, in order to provide generated electrical power to such components.

In some embodiments, other energy sources may be used to supplement the power provided by AWT 308. For example, ocean-going vessel 300 may utilize one or more other renewable or "green" energy sources, such as a solar energy generation system (e.g., solar cells), a bio-fuel energy generation system, and/or a synthetic fuel energy generation system, among other possibilities. An ocean-going vessel 300 could additionally or alternatively utilize a low carbon power generation method to supplement the AWT 308, such as by including a nuclear power system that generates electricity for the vessel. Further, in some embodiments, ocean-going vessel 300 could also utilize one or more non-renewable sources energy sources, such as by using an internal combustion engine and/or other types of energy generation systems that burn a fossil fuel. (Preferably, however, the ocean-going vessel 300 is designed so as to minimize and hopefully eliminate use of such fossil fuels.)

In some scenarios, the ocean-going vessel 300 may even be configured to power its systems using some of the fuel that has been stored fuel storage container 310, which was previously produced by its refinery system 306. For example, there might be scenario where there is an extended period of without winds that are suitable for electrical power generation by the AWT, and/or where conditions are such that other green energy sources are not able to generate adequate amounts of energy to power the ocean-going vessel 300. In such a scenario, the ocean-going vessel 300 might utilize some of the fuel that the refinery system 306 has produced and stored in fuel storage container 310 in order that the vessel can continue operation until winds are again conducive for electrical power generation by the AWT and/or until conditions are such that another green power generation system can again be utilized to power the vessel.

E. Illustrative Refinery Systems

In an example embodiment, ocean-going vessel 300 includes at least one refinery system 306. The refinery system 306 is operable to use both the $H_2$ produced by electrolysis system 304 and the $CO_2$ extracted by the electrodialysis system 306 to produce at least one type of fuel or petrochemical. Further, in some embodiments, an ocean-going vessel 300 may include multiple refinery systems, such that the vessel is capable of producing multiple types of fuels or petrochemicals. It is also possible that a single refinery system may be operable to produce a number of different types of fuels or petrochemicals. In embodiments, where an ocean-going vessel 300 is capable of producing two or more different types of fuels or petrochemicals, the vessel may include multiple storage containers 310, such that the each fuel or petrochemical can be stored in a separate container.

Various types of refinery systems, which produce various fuels or petrochemicals from the inputs of hydrogen ($H_2$) and carbon dioxide ($CO_2$), are currently known in the art. Further, there is much interest in developing new and more efficient processes for producing fuel from renewable inputs such as hydrogen ($H_2$) and carbon dioxide ($CO_2$) (and from $CO_2$ in particular, due to the urgent need to prevent further increase, and hopefully decrease, the amount of $CO_2$ in the atmosphere and oceans).

Some examples of processes that may be used by a refinery system 306 will now be described. However, it should be understood that these examples are provided for explanatory purposes, and are not intended to be limited. It is contemplated that an ocean-going vessel's refinery system could potentially utilize any process that is currently known or later developed for fuel or chemical production using $H_2$ and $CO_2$ as inputs.

In some embodiments, refinery system 306 may use a number of catalyzed syngas reactions to selectively produce ethanol directly from CO2 and H.

In some cases, CO2 and H2 may be used to create methanol, which may then be used to create ethanol. For Example, production of ethanol from methanol may use catalyzed syngas to perform a homologation reaction, such as the following: $CH_3OH+CO+2H_2 \rightarrow (catalyst) \rightarrow C_2H_5OH+H_2O$.

As another example of ethanol production from methanol, bromine and a Gilman reagent may be utilized to synthesize ethanol from methanol. In particular $CH_3Br$ and water may be produced as follows: $CH_3OH+HBr \rightarrow CH_3Br+H_2O$. A Gilman reagent may then be utilized as follows: $CH_3BR+(CH_3)_2Cu-Li^+ \rightarrow CH3-CH3+CH_3BrCu^+Li^-$. The product may then be heated to deprotinate it and produce ethane as follows: $CH_3-CH_3+heat \rightarrow CH_2=CH_2$. The ethane may then be treated with an acid and water to yield ethanol as follows: $CH_2=CH_2+H_2SO_4+H_2O \rightarrow CH_3-CH_2-OH$.

In some embodiments, a refinery system 306 may include or take the form of a Fischer-Tropsch reactor, which utilizes a Fischer-Tropsch process to produce a liquid hydrocarbon. A typical Fischer-Tropsch process involves a sequence of chemical reactions that produces a liquid hydrocarbon from a mixture of carbon monoxide (CO) and hydrogen ($H_2$) gases (a mixture that may also be referred to as "syngas"). For instance, a number of useful hydrocarbons following the formula of $C_nH_{(2n+2)}$ may be produced using Fischer-Tropsch processes. In particular, various Fischer-Tropsch processes may produce such hydrocarbons via reactions that follow the formula of: $(2n+1)H_2+n\ CO \rightarrow C_nH_{(2n+2)}+n\ H_2O$.

Since a typical Fischer-Tropsch process utilizes carbon monoxide (CO) as an input, a refinery system 306 may be configured to produce CO from the CO2 that is supplied by electrodialysis system 302. For example, refinery system 306 may implement a reverse water gas shift process that takes $H_2$ and $CO_2$ gases as inputs and produces carbon monoxide and water as follows: $11\ CO_2+11\ H_2 \rightarrow 11\ CO+11\ H_2O$. Other examples are also possible. The carbon monoxide that is produced from such a process may then be used in a Fischer-Tropsch process. Further, the ocean-going vessel 300 may release the water that is produced in the reverse water gas shift process back into the ocean, and/or use this water for other purposes.

In exemplary embodiment, a Fischer-Tropsch process may be used to produce a synthetic fuel (also referred to as a "synfuel") from syngas. The refinery system 306 may be further configured to process some or all of the synthetic fuel to convert the synthetic fuel into ethanol. For example, the refinery system 306 may use syngas fermentation, which is microbial process where certain microorganisms, such as various acetogens, to produce ethanol, methanol, and/or other chemicals via syngas utilization.

In some embodiments, a refinery system 306 could utilize a Fischer-Tropsch process to produce synthetic jet fuel (e.g., $C_{11}H_{24}$) or a synthetic diesel fuel, which may then be stored in an appropriately-designed fuel storage container 310. For example, $H_2$ and $CO_2$ may be used by the refinery as inputs to a reverse water gas shift process that produces carbon monoxide and water as described above. The following Fischer-Tropsch process may then be applied to convert a mixture of the carbon monoxide and hydrogen into a liquid jet fuel and oxygen gas as follows: $11\ CO_2 + 12\ H_2O \rightarrow C_{11}H_{24} + 17\ O_2$.

Other types of Fischer-Tropsch processes may be implemented by an example refinery system 306. Additionally or alternatively, a refinery system may implement processes other than Fischer-Tropsch processes, which utilize $H_2$ and $CO_2$ to produce ethanol, methanol, and/or other fuels and/or chemicals.

IV. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system comprising:
   an ocean-going vessel;
   an electrodialysis system arranged on the ocean-going vessel and configured to extract carbon dioxide ($CO_2$) from seawater;
   an electrolysis system arranged on the ocean-going vessel and configured to apply electrolysis to seawater to produce hydrogen ($H_2$);
   a refinery system configured to use both the $H_2$ produced by electrolysis system and the $CO_2$ extracted by the electrodialysis system to produce a fuel or chemical; and
   at least one airborne wind turbine (AWT), wherein the AWT comprises a tethered aerial vehicle that is tethered to the ocean-going vessel and flies in a circular or ellipsoidal path to convert wind energy to electrical energy, wherein the aerial vehicle comprises rotors that are operable in a first mode to convert wind energy to electrical energy during crosswind flight, wherein the aerial vehicle is further operable in a second mode to pull the ocean-going vessel in a desired direction, and wherein the at least one AWT provides power for at least one of the electrolysis system and the electrodialysis system.

2. The system of claim 1, wherein the refinery system is configured to:
   use both the $H_2$ produced by electrolysis system and the $CO_2$ extracted by the electrodialysis system to produce a synthetic fuel; and
   convert at least some of the synthetic fuel into ethanol.

3. The system of claim 1, wherein the electrodialysis system is configured to use bipolar membrane electrodialysis (BPMED) to extract $CO_2$ from seawater.

4. The system of claim 1, wherein the fuel is a petrochemical or petrofuel.

5. The system of claim 1, wherein the refinery system comprises a Fischer-Tropsch reactor.

6. The system of claim 1, wherein refinery system is configured to produce a diesel fuel.

7. The system of claim 1, wherein refinery system is configured to produce a jet fuel.

8. The system of claim 1, wherein refinery system is configured to produce a methanol.

9. The system of claim 1, further comprising a fuel storage container for storing the fuel or chemical.

10. The system of claim 1, wherein the ocean-going vessel further comprises an intake for water, such that movement of the ocean-going vessel causes seawater to move through the intake towards the electrolysis system.

11. The system of claim 1, wherein the AWT is configured to operate in a plurality of modes, wherein the plurality of modes comprise at least: (a) a hover mode, (b) a crosswind-flight mode, and (c) a vessel-steering mode.

12. The system of claim 1, wherein the ocean-going vessel further comprises an intake for water, such that movement of the ocean-going vessel causes seawater to move through the intake towards the electrodialysis system.

13. A method comprising:
   operating at least one airborne wind turbine (AWT) to convert wind energy to electrical energy, such that the AWT provides power to at least one of an electrolysis system and an electrodialysis system for at least some period of time, wherein both the electrodialysis system and the electrolysis system are disposed on an ocean-going vessel, and wherein the AWT comprises a tethered aerial vehicle that is tethered to the ocean-going vessel and flies in a circular or ellipsoidal path to convert wind energy to electrical energy, wherein the aerial vehicle comprises rotors that are operable in a first mode to convert wind energy to electrical energy during crosswind flight, and wherein the aerial vehicle is further operable in a second mode to pull the ocean-going vessel in a desired direction;
   operating the electrodialysis system to extract carbon dioxide ($CO_2$) gas from seawater;
   operating the electrolysis system to apply electrolysis to seawater to produce hydrogen ($H_2$) gas; and
   operating a refinery system to: (a) receive both the $H_2$ gas produced by electrolysis system and the $CO_2$ gas extracted by the electrodialysis system and (b) process a mixture of the $H_2$ gas and the $CO_2$ gas to produce a fuel or chemical.

14. The method of claim 13, wherein the refinery system is configured to produce methanol.

15. The method of claim 13, wherein operating the refinery system process a mixture of the $H_2$ gas and the $CO_2$ gas to produce a fuel or chemical comprises operating the refinery system to process the mixture of the $H_2$ gas and the $CO_2$ gas to produce a synthetic fuel.

16. The method of claim 13, wherein the refinery system is configured to produce ethanol.

17. A system comprising:
   an ocean-going vessel;
   a first water-processing system arranged on the ocean-going vessel and configured to extract carbon dioxide ($CO_2$) from seawater;
   a second water-processing system arranged on the ocean-going vessel and configured to apply electrolysis to seawater to produce hydrogen ($H_2$);
   at least one refinery system configured to use both the $CO_2$ extracted by the first water-processing system and the $H_2$ produced by second water-processing system and the to produce at least one fuel or chemical; and at least one airborne wind turbine (AWT) configured for power generation, wherein the at least one airborne wind turbine provides power for at least one of the first water-processing system and the second water-processing system, wherein the AWT comprises a tethered aerial vehicle that is tethered to the ocean-going vessel and configured to fly in a circular or ellipsoidal path to convert wind energy to electrical energy, wherein the aerial vehicle comprises rotors that are operable in a first mode to convert wind energy to electrical energy during crosswind flight, and wherein the aerial vehicle is further operable in a second mode to pull the ocean-going vessel in a desired direction.

18. The system of claim 17, wherein the first water-processing system comprises an electrodialysis system.

19. The system of claim 17, wherein the second water-processing system comprises an electrolysis system.

20. The system of claim 17, wherein the refinery system is configured to process a mixture of the $H_2$ and the $CO_2$ to produce a synthetic fuel.

21. The system of claim 20, wherein the refinery system is further configured to convert at least some of the synthetic fuel into ethanol.

* * * * *